US011176940B1

(12) United States Patent
Zhong et al.

(10) Patent No.: US 11,176,940 B1
(45) Date of Patent: Nov. 16, 2021

(54) RELAYING AVAILABILITY USING A VIRTUAL ASSISTANT

(71) Applicant: Amazon Technologies, Inc., Seattle, WA (US)

(72) Inventors: Gary Zhong, Milpitas, CA (US); Jonathan Alan Leblang, Menlo Park, CA (US); Aakarsh Nair, Lynnwood, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 16/573,867

(22) Filed: Sep. 17, 2019

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC ................................................... 704/1–504
See application file for complete search history.

(56) References Cited

U.S. PATENT DOCUMENTS

| 8,326,634 | B2 * | 12/2012 | Di Cristo | G10L 15/1822 704/270.1 |
| 10,325,599 | B1 * | 6/2019 | Naidu | H04M 3/42068 |
| 10,374,816 | B1 * | 8/2019 | Leblang | H04L 12/1822 |
| 10,536,288 | B1 * | 1/2020 | Leblang | H04M 3/568 |
| 10,733,993 | B2 * | 8/2020 | Kudurshian | G10L 15/30 |
| 10,911,594 | B2 * | 2/2021 | Ly | H04M 3/42008 |
| 2004/0215464 | A1 * | 10/2004 | Nelson | B60R 16/0373 704/275 |
| 2007/0043687 | A1 * | 2/2007 | Bodart | G06Q 10/107 |
| 2007/0180060 | A1 * | 8/2007 | Patel | G06Q 10/107 709/219 |
| 2011/0131045 | A1 * | 6/2011 | Cristo | G10L 15/26 704/249 |
| 2014/0278343 | A1 * | 9/2014 | Tran | G06F 40/53 704/2 |
| 2014/0280757 | A1 * | 9/2014 | Tran | G06Q 50/10 709/219 |
| 2014/0343950 | A1 * | 11/2014 | Simpson | G10L 15/22 704/275 |

(Continued)

*Primary Examiner* — Marcus T Riley
(74) *Attorney, Agent, or Firm* — Lee & Hayes, P.C.

(57) ABSTRACT

Technologies are disclosed for relaying availability information using a virtual assistant. The virtual assistant can serve as a personal assistant to a user and receive and provide availability information associated with a user. The availability information may include information such as, but not limited to location information about the user, timing information, (e.g., a time the user left), message information (e.g., a message left by the user, a message left by a person looking for the user, . . . ), and the like. The availability information that is provided by the virtual assistant may be different depending on the identity of the requesting user. The virtual assistant may also record messages from requesting users that may be provided to the user upon return and/or while the user is away (e.g., via email, text message, instant message, phone call, and the like).

20 Claims, 8 Drawing Sheets

(56) References Cited

U.S. PATENT DOCUMENTS

| | | | |
|---|---|---|---|
| 2015/0088514 A1* | 3/2015 | Typrin | G06F 3/167 |
| | | | 704/249 |
| 2017/0083285 A1* | 3/2017 | Meyers | G10L 15/26 |
| 2017/0092278 A1* | 3/2017 | Evermann | G10L 15/22 |
| 2017/0293610 A1* | 10/2017 | Tran | G06Q 10/025 |
| 2018/0061403 A1* | 3/2018 | Devaraj | G06F 3/167 |
| 2018/0337962 A1* | 11/2018 | Ly | G10L 17/00 |
| 2018/0366118 A1* | 12/2018 | Lovitt | G06N 99/00 |
| 2019/0027147 A1* | 1/2019 | Diamant | G06F 16/3329 |
| 2019/0066670 A1* | 2/2019 | White | G10L 15/28 |
| 2020/0143807 A1* | 5/2020 | Ko | G10L 15/16 |
| 2020/0153646 A1* | 5/2020 | Leblang | G06F 3/167 |

\* cited by examiner

RELAYING AVAILABILITY USING A VIRTUAL ASSISTANT

BACKGROUND

Today, when we are away from our home or office, we often let others know our whereabouts with a brief message. For instance, when a person, such as Sally, is away from her desk, Sally may send out an email, a meeting invitation, or an instant message, to some colleagues to inform them that she will be away. In many cases, however, a person leaving home, or the office may not leave any away message. In other cases, Sally may have forgotten to notify some colleagues, and others that received the away message may have forgotten receiving the away message. When a colleague cannot find Sally at her desk, the colleague may ask an office neighbor, or some other colleague of Sally to relay a message. Her colleague may leave a sticky note on Sally's desk.

Similarly, at home, a family member may want to let other family members know where they are in case they want to find him/her. For example, a teenager may want to leave a message to her parents that she will be at her neighbor's house for two hours. A husband may want to let his family know that he is going to the grocery store for about an hour. A wife may want to let her children that she left for work early and that she left lunches for them in the refrigerator. In these cases, the family member might leave a note on the refrigerator door, send a text message, and the like.

Even though mechanisms exist to inform other people of a person's whereabouts, these mechanisms may not be very effective in practice. As briefly discussed, in many cases, a person leaving home or office may not leave an away message, may have forgotten to send the away message to some individuals, and/or a recipient of a message may simply have forgotten receiving the message. Further, valuable time and effort may be wasted trying to find a person who is away. For example, a person trying to find another person may contact other people to find out if they know where the person located.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
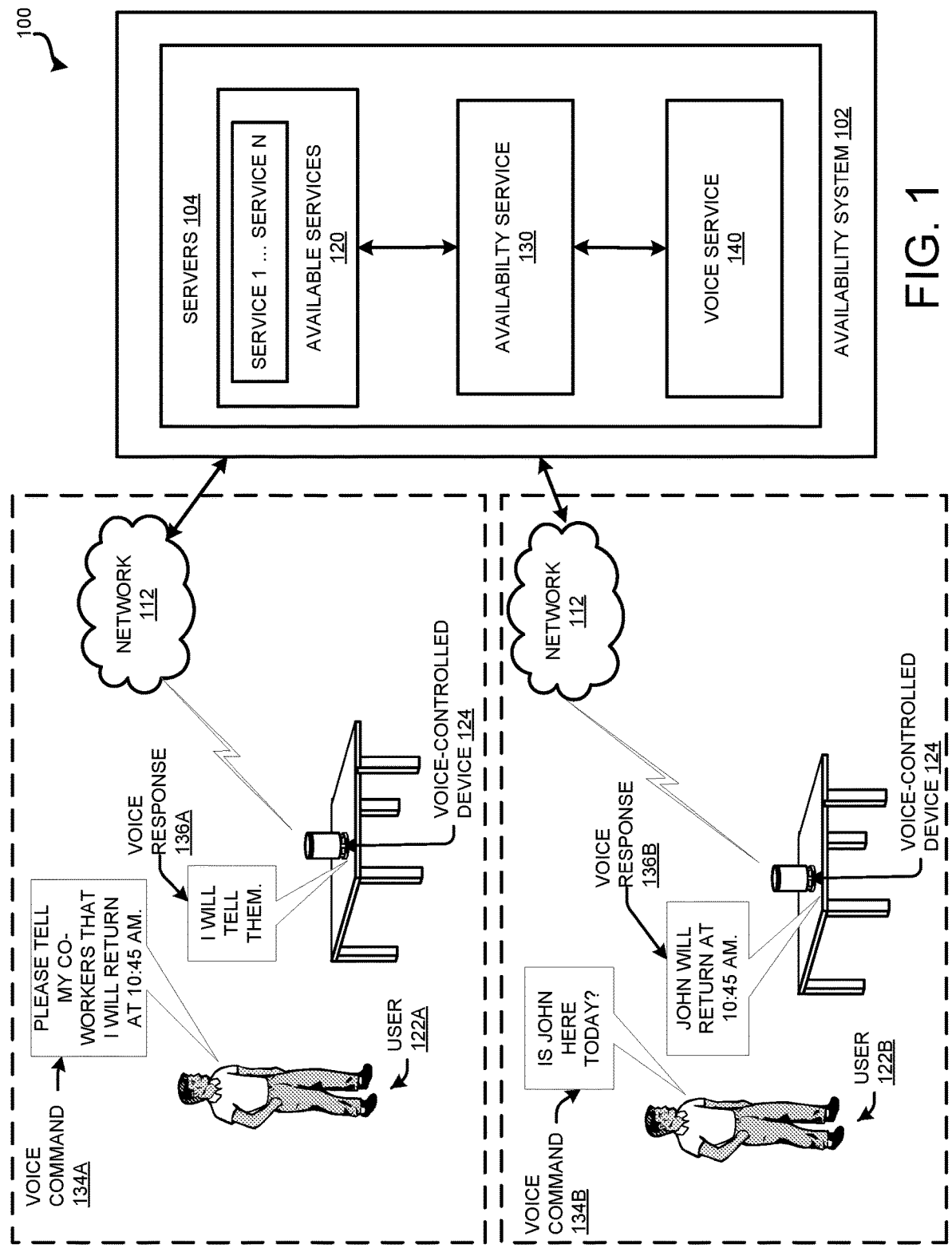
FIG. 1 is a software and network architecture diagram showing aspects of the configuration and utilization of an availability system for relaying availability using a virtual assistant.

The following detailed description is directed to technologies for relaying availability using a virtual assistant. The virtual assistant can serve as a personal assistant to users, such as workers, family members, etc. to answer questions associated with where the user is located or when the user will be returning.

According to some examples, a user may utilize a virtual assistant to provide availability information to other users about their availability. As used herein, "availability information" refers to any information that is associated with the availability of a user. The availability information may include information such as, but not limited to, location information about the user, timing information, (e.g., a time the user left, an estimated time the user will return), message information (e.g., a message left by the user, a message left by a person looking for the user, a message generated by the availability service, . . . ), and the like.

Prior to the technologies described herein, it could be difficult to determine the availability information for a user. The availability information that is provided by the virtual assistant may be different depending on the identity of the user requesting the information. For instance, when the requesting user is determined to be a family member of the user, or a colleague of the user on the same work team, the virtual assistant may provide more details compared to when the requesting user is a colleague on a different work team. When the requesting user is unknown, the virtual assistant may tell the requesting user that they are not recognized, and that no information is available, or may provide a very brief message.

According to some configurations, the virtual assistant utilizes an availability service. The availability service may be hosted by a service provider network that provides functionality utilized by the virtual assistant to interact with different users to receive and provide availability information. The availability service may utilize other services and/or functionality hosted by the service provider network and/or some other source.

In some examples, the virtual assistant listens for speech from individuals in the environment that is associated with receiving/providing availability information. According to some configurations, the virtual assistant attempts to determine an identity of the user providing the speech. For instance, the virtual assistant may be configured to identify the speech of household members, co-workers, and the like. In this way, the virtual assistant may personalize responses and interactions for the recognized users. In some configurations, the virtual assistant identifies speakers using voice profiles described in more detail below.

According to some configurations, the virtual assistant may allow users that are identified and authorized to use the virtual assistant to provide availability information and to record one or more messages. For example, imagine that John (identified as an authorized user of the virtual assistant), tells the virtual assistant that he will be away for some period of time and leaves a message for his wife, Mary. When Mary (also an authorized user) asks the virtual assistant where John is, the virtual assistant recognizes Mary and plays John's away message intended for her.

According to some examples, one or more of the authorized users of the virtual assistant may provide availability information using the virtual assistant. As used herein, an "authorized user" of a virtual assistant refers to the user(s) who can specify availability information. Generally, the authorized users of a virtual assistant include an owner of the virtual assistant and a few other designated users such as family members, or possibly one or more friends or co-workers that might share the virtual assistant.

As briefly discussed above, the availability information that is provided to a user requesting the information (which may be referred to herein as a "requesting user") may be personalized based on the identity of the requesting user. For instance, when the requesting user is determined to be a supervisor of the user, the availability service may provide more details via the virtual assistant compared to when the requesting user is unknown by the user.

According to some configurations, a user may record one or more messages to be played for a requesting user. For example, the user who will be away may record a general message that provides general availability information (e.g., "I'm away from my desk but will be returning by 10 A.M"). The user may decide to record one or more additional messages. For example, the user may record a more detailed message that is played to some users (e.g., "I'm in a meeting with Ted, Ravi, and Linda in room 111 if you need me"). The user might also decide to record a personal message that is played to possibly just one person (e.g., "Hi Kevin. I could use your help in a meeting I'm attending now. Could you come meet me in room 111. Thanks!".) A user may record any number of messages and associate the playback of the messages with different users.

In other examples, the user may authorize the availability service to automatically determine a level of detail to provide in a message. For instance, the availability service may determine the level of detail to provide to a requesting user based on a relationship of the requesting user to the user. In some configurations, the availability service may access an organizational chart, or some other data source, that identifies a relationship of the requesting user to the user who is away. For example, a requesting user that is in the same work group of the user may receive a first message, a requesting user that is a boss of the user may receive a second message, a requesting user that is in another group of the user may receive a third message, an unknown user may receive a fourth message, and the like.

In addition to providing availability information about the user to the requesting user, the availability service may be configured to provide, via the virtual assistant and/or some other mechanism, the user with information about the users who stopped by or requested information about the user while the user was in a remote location. As an example, the availability service may inform the user that 11 people stopped by, 2 people came by twice, and 5 people requested information about the user.

In some configurations, the virtual assistant may record messages from requesting users that may be provided to the user upon return and/or while the user is away (e.g., via email, text message, instant message, phone call, and the like). For example, the virtual assistant may ask the requesting user whether they would like to leave a message. After receiving the message from the requesting user, the virtual assistant may determine whether to deliver the message to the user that is away before the user returns or wait for the user to return.

In some configurations, the virtual assistant delivers messages based on settings specified by an authorized user of the virtual assistant. In other configurations, the virtual assistant may determine the time to deliver messages based a relationship of the user that left the message to the user that is away. For example, a message received from a supervisor may be delivered immediately, whereas a message left by a co-worker in another group may not be delivered until the user returns.

In addition to providing auditory information, the virtual assistant and/or some other device in the environment, may provide other types of availability information such as visual information. For instance, one or more lights on the virtual assistant may change to indicate that the user is away. For example, a light may be red indicating that the user is out for the day, yellow indicating that the user will be returning, and the like. A frequency, rate, and/or color in which the light is blinking may also indicate different availability statuses of the user, such as whether the user is out for the day, is busy, will be returning, and so on. In some configurations, the virtual assistant might also display a picture or text indicating that the user is away. The virtual assistant may also provide other information such as a time the user is expected back, a telephone number where the user may be reached, and the like.

According to some examples, the availability service may access other services to obtain data that may be used to automatically populate availability information about where the user is located and when the user will return. For example, the availability service can access the one or more work calendars, or other calendars, to automatically populate the availability and location of the user. Imagine that John's colleague Mary did not find John at his desk. Mary asks John's virtual assistant, "Is John in office today?" The virtual assistant recognizes Mary and accesses John's work calendar to see if John configured an out of office auto reply, sent an out of office invite, or has a meeting or time blocked off in the calendar. If the calendar data indicates John is away, the virtual assistant may provide availability information about John to Mary even if John did not specifically tell the virtual assistant that he would be away. According to some configurations, John may configure the generation of automatic replies. The virtual assistant may also check a timestamp of the last utterance received by John while in the office. If the timestamp was within a predetermined period of time (e.g. the last hour, today, . . . ), the virtual assistant may provide a response to Mary indicating that John was in the office today.

For purposes of explanation, imagine the following scenarios. An authorized user of the virtual assistant may inform the virtual assistant that they will be away. For instance, John (an authorized user of the virtual assistant) may tell the virtual assistant that he is working from home today by saying, "Virtual assistant, I am working from home today." When a requesting user comes by to look for John, the requesting user, who is recognized by the virtual assistant (or authorized using some other mechanism), may be informed by the virtual assistant availability information about John.

For instance, imagine that when Bob comes by John's desk, Bob sees that a ring on John's virtual assistant is slowly blinking yellow. Bob asks the virtual assistant, "Where is John?". The virtual assistant accesses the availability information that John provided and/or John's calendar (or some other data source) and determines that John is out until June 3. The virtual assistant might also determine that John has his email auto reply configured. In some configurations, the contents of the auto reply email may be used as the message provided to the requesting user. The virtual assistant may tell Bob that, "John is out of office until June 3. John left a message 'Hi. I am on vacation. For urgent issues, please contact my manager, Tony Jones.'"

The virtual assistant then asks Bob "Would you like to leave a message for John?". Bob can reply, "Yes, tell him that Bob Smith came by to look for the updated sales forecast". Once Bob leaves a message, the availability service, or some other component, or application may cause one or more lights on the virtual assistant to slowly blink another color or another pattern to indicate that someone who was looking for him left a message.

When John returns from his vacation, he sees the blinking indicating that one or more messages have been received. John asks the virtual assistant "who was looking for me?" The virtual assistant may say, "Three persons were looking for you. One person left you a message. Would you like to hear it?" John says, "Yes, please play the message". The virtual assistant says, "Bob Smith came by to look for the updated sales forecast." If John enabled other notifications, the availability service can utilize a voice service, or some other component, to transcribe Bob's voice message as text, accesses John's configured phone number, and sends John an electronic message, (e.g., a text message).

In another scenario, John is in office and he finds himself starting to feel ill. He can say to the virtual assistant, "I will be away for today. Announce that I will be working from home. I caught the flu." When Jane comes by to John's desk and asks the virtual assistant for John, the virtual assistant will say to Joan (a recognized user) "John is out of office today. John left a message, 'I will be working from home. I caught the flu.'"

At home, a family member can use one or more of the virtual assistants at home to announce their availability and whereabouts. Before Mary goes to a neighbor's house, she can say, "I will be away. Announce that I am out with friends." When Mary's mom, Jane comes back to home from work. She asks, "Where is Mary?" The virtual assistant says, "Mary is away. Mary left a message. 'I am out with friends.'" The virtual assistant may then ask Jane "Would you like to leave a message for Mary?" Jane can respond, "Dad and I are going out for movie. Order a pizza if you when you are hungry." Since the virtual assistant recognizes Jane's voice (e.g., comparing voice signatures), the virtual assistant may be configured to send a text message to Mary, "Jane stopped by. Jane said 'Dad and I are going out for movie. Have fun with your friends, come home before 8.'"

Additional details regarding the various components and processes described briefly above for relaying availability using a virtual assistant will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of an availability system for relaying availability using a virtual assistant. It is to be appreciated that the environment 100 is merely illustrative and that the various configurations disclosed herein can be utilized in many different types of computing environments.

To provide the availability service 130 and the other functionality disclosed herein, the availability system 102 may include one or more servers 104. The servers 104 can execute software components to provide the services described herein, including availability functionality using a virtual assistant and different services provided by a service provider and/or some other entity. The software components can execute on a single server 104 or in parallel across multiple servers in the availability system 102. In addition, a software component can consist of subcomponents executing on different servers 104 or other computing devices in the availability system 102. Various components can be implemented as software, hardware, or any combination of the two. In this regard, it is to be appreciated that the availability system 102 shown in FIG. 1 has been simplified for discussion purposes and that many additional software and hardware components can be utilized.

A user 122, such as user 122A and/or user 122B, of the availability system 102 can utilize a virtual assistant, via a voice-controlled device 124 or some other input device, to access the availability system 102 through a network 112. Generally, a "virtual assistant" as used herein refers to software and/or hardware that receives input from a user and completes tasks for the user. As described herein, the virtual assistant is configured to understand natural language voice commands and complete tasks for the user, such as receiving/providing availability information. The user 122 can be an individual that desires to receive recommendations and have actions performed that are associated with the availability system 102. In some examples, the user 122 is a customer of the service provider network.

The voice-controlled device 124 is an input device configured to receive voice queries/commands/utterances (which may collectively be referred to herein as "voice commands") from the user and provide data to a virtual assistant. The voice-controlled device 124 may include one or more microphones for capturing audio data (e.g., voice utterances or commands of users) within an environment 100 and generating audio signals that represent or are otherwise associated with sound (e.g., the audio data) from the environment 100, including the voice utterances/commands of the users.

The voice-controlled device 124 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 112 and communicating with the availability system 102. In other configurations, the voice-controlled device 124 may be configured to communicate with one or more other devices to receive voice commands from users and/or perform processing related to functionality of the availability system.

In some configurations, the voice-controlled device 124 may be configured to perform speech recognition, such as automatic speech recognition (ASR), on the audio signals to identify words or phrases associated with the voice commands therein or may be configured to provide the audio signals to another device (e.g., a remote service such as availability system 102) for performing the ASR on the audio signals for identifying the voice commands. In other examples, ASR may be performed by a different computing system and/or service.

As used herein, performing ASR on an audio signal to identify a voice command may include translating speech represented in the audio signal into text and analyzing the text to identify the voice command. Analysis of the text may be performed, locally by the voice-controlled device 124 and/or remotely by the one or more servers 104 (or other remote services), using natural language processing (NLP) and/or natural language understanding (NLU) techniques in order to determine an intent associated with the voice command.

Within FIG. 1, a user 122 may interact with the voice-controlled device 124 within the environment 100 by using voice commands. For instance, the user 122A may provide availability information (e.g., "I will be away for an hour to attend a meeting in Room 111?") to the voice-controlled device 124. Many other voice commands can be utilized to interact with the availability system 102, such as "Where is John", "Is she returning?", "Please record a message", and the like. In each example, the voice-controlled device 124 may interact with one or more remote services, discussed below, to receive and provide availability information.

As illustrated, the voice-controlled device 124 may couple with an availability system 102 over a network 112. The network 112 may represent an array or wired networks, wireless networks (e.g., Wi-Fi), or combinations thereof. The availability system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the availability system 102, include "on-demand computing", "software as a service (SaaS)", "platform computing", "network accessible platform", and so forth.

As illustrated, the availability system 102 may comprise one or more network-accessible resources, such as servers 104. These resources comprise one or more processors and computer-readable storage media executable on the processors. In some configurations, the user 122A and/or the user 122B may be identified and/or authenticated before interacting with the voice-controlled device 124 that is associated with the availability system 102. In some examples, the voice-controlled device 124 is awakened upon identifying a predefined wake word. After being awakened, the voice-controlled device 124 may upload an audio signal representing sound captured in the environment 100 to the availability system 102 over the network 112.

In other configurations, the virtual assistant provided via the voice-controlled device 124 may be awoken using some other technique. In response to receiving this audio signal, the voice service 140 may perform ASR, NLU, and/or NLP on the audio signal to identify one or more user voice commands therein. For instance, in the illustrated example, the voice service 140 may identify the user 122A asking the voice-controlled device 124 to tell co-workers that they will return at 10:45. The voice service 140 may also attempt to identify any users, such as user 122B, requesting availability information about user 122A.

The network 112 can be a local-area network ("LAN"), a wide-area network ("WAN"), the Internet, or any other networking topology known in the art that connects the user devices to the availability system 102. The user 122A can use an application (not shown) executing on voice-controlled device 124 to access and utilize the availability service functionality provided by the servers 104. In some examples, the application is a web browser application (not shown), such as the Amazon® Silk® web browser, or some other web browser. Generally, a web browser application exchanges data with the servers 104 in the availability system 102 using the hypertext transfer protocol ("HTTP") over the network 112. The application might also be a stand-alone client application configured for communicating with the servers 104.

The client application can also utilize any number of communication methods known in the art to communicate with the availability system 102 and/or the servers 104 across the network 112, including remote procedure calls, SOAP-based web services, remote file access, proprietary client-server architectures, and the like. According to some configurations, the application may provide a user interface that can be utilized by the user 122A to configure settings associated with the availability service and/or the voice-controlled device 124. Typically, a user 122 interacts with the voice-controlled device 124 using speech that is captured by one or more microphones of the voice-controlled device 124.

The voice service 140, or some other component may process a corresponding audio signal associated with the audio data/voice command to determine words within the voice command (using automatic speech recognition techniques—ASR) and to determine an intent of the user (natural language processing techniques—NLU). Based on the identified words/intent, the voice service 140 can determine whether the voice command is related to the availability service 130 and/or some other service or functionality.

As briefly discussed above, the voice-controlled device 124 may act as an input device for a virtual assistant for authorized users, such as user 122A. An authorized user, such as user 122A, may provide availability information to the voice-controlled device 124 that may be relayed to a virtual assistant that is configured to provide this information to other users. The availability information that is relayed may include information such as, but not limited to, location information about the user, timing information, (e.g., a time the user left, a time the user will return), message information (e.g., a message left by the user, a message left by a person looking for the user, a message generated by the availability service, . . . ), and the like.

In the example illustrated in FIG. 1, user 122A has uttered "Please tell my co-workers that I will return at 10:45 AM (voice command 134A) to the voice-controlled device 124. The user 122A may record other messages (not shown) that may be played in addition to the message indicated in voice command 134A and/or in place of the message indicated in voice command 134A. For example, the user 122A may record a general message that provides general availability information and a more detailed message that is played to a smaller group of users (e.g., "I will return at 10:45 AM. I am in meeting room 111 if you need me sooner"). A user may record any number of messages and associate the playback of the messages with different users. The message may be uttered by the user 122A, captured by one or more microphones of the voice-controlled device 124, and stored by the voice-controlled device 124 and/or one or more remote devices/services. In other embodiments, the user 122A may input the message via one or more input mechanisms (e.g., a keyboard, a display, etc.).

Upon receipt of the voice-command 134A, the voice-controlled device 124A, and/or the voice service 140, and/or some other component or service (local or remote from the voice-controlled device 124), may attempt to identify the speaker. According to some configurations, the voice service 140 compares the voice command 134 to voice profiles already created. The voice profiles may be stored in a data store associated with the availability system 102 and/or on the voice-controlled device 124, or some other location. Generally, if the voice service 140 determines a match between a voice signature determined from the voice command 134 and a stored profile, an identity of the user 122 is determined. When no match is made, the voice-controlled device 124 may provide output to the user indicating that they are not recognized. In some examples, the voice-controlled device may provide the unrecognized user 122 an option to be identified using some other mechanism (e.g., logging into a system, providing further details, . . . ).

In the current example, user 122A is recognized to be an authorized user of the voice-controlled device 124 that is authorized to provide availability information. According to some examples, more than one user may be an authorized user of the voice-controlled device 124. In response to user 122A providing voice command 134A, the voice-controlled device 124 provides voice response 136A (e.g., "I will tell them", or some other confirmation message). Upon processing the voice command 134A, the availability service 130 updates records indicating that the user 122A will be away until 10:45 AM along with the message "I will return at 10:45 AM". In some configurations, information generated by the availability service 130, or some other component or device that is located remotely from the voice-controlled device 124, may be stored locally such that if the availability service 130 is not accessible for some period of time, the voice-controlled device 124 may access the information that may be processed locally by the voice-controlled device 124 or some other computing device.

When user 122B comes to John's office, they utter "Is John here today?", or some other voice command 134B requesting availability information of an authorized user of voice-controlled device 124. As discussed above, the availability information that is provided to a requesting user, such as user 122B, may be personalized based on the identity of the user. For instance, when the requesting user is determined to be a supervisor of the user, the availability service may provide more details via the virtual assistant compared to when the requesting user is unknown by the user. In the current example illustrated in FIG. 1, the user identifies user 122B as a co-worker of user 122A and provides voice response 136B (e.g., "John will return at 10:45 AM"). According to some configurations, the voice service 140 may store voice profiles of other users. For example, the voice service 140 may store (when authorized) voice profiles of the co-workers, friends, family members, and the like of the user 122A. According to some examples, the availability service 130 may determine a relationship between the user 122A and the requesting user 122B. In some configurations, the availability service 140 accesses data indicating the relationship (e.g., an organizational chart, or the like).

In some examples, the user 122A may authorize the availability service 130 to automatically determine a level of detail to provide in a voice response 136. For instance, the availability service 130 may determine the level of detail to provide to a requesting user based on a determined relationship of the requesting user 122B to the user 122A. For example, a requesting user 122B that is in the same work group of the user may receive a first message, a requesting user 122B that is a boss of the user 122A may receive a second message, a requesting user 122B that is in another group may receive a third message, an unknown user may receive a fourth message, and the like.

In addition to providing availability information about the user 122A to the requesting user 122B, the availability service 130 may be configured to provide, via the virtual assistant and/or some other mechanism, the user 122A with information about the users who stopped by or requested information about the user. In the current example, the availability service 130 may inform the user 122A that user 122B stopped by but did not leave a message.

As discussed above, the voice-controlled device 124 may be used to record messages from requesting users 122B that may be provided to the user 122A upon return and/or while the user 122A is away (e.g., via email, text message, instant message, phone call, and the like). These messages may be stored local to the voice-controlled device 124 and/or remotely from the voice-controlled device 124 (e.g., using a data store associated with the availability system 120. For example, the voice-controlled device 124 may ask the requesting user 122B whether they would like to leave a message. After receiving a message from a requesting user 122B, the virtual assistant associated with the voice-controlled device 124 may determine whether to deliver the message to the user 122A before the user 122A returns or wait for the user 122A to return. In some configurations, the voice-controlled device 124 delivers messages based on settings specified by the user 122A. In other configurations, the voice-controlled device 124 may determine the time to deliver messages based a relationship of the user that left the message to the user that is away. For example, a message received from a supervisor may be delivered immediately. For the purposes of this discussion, a message may be output in multiple ways, such as audibly via one or more speakers of the voice-controlled device 124, via text presented via a display, via one or more images/videos, and so on.

In addition to providing auditory information, the voice-controlled device 124 and/or some other device in the environment 100, may provide other types of availability information such as visual information. For instance, one or more lights on the voice-controlled device 124 may change to indicate that the user 122A is away. For example, a light may be red indicating that the user 122A is out for the day, yellow indicating that the user 122A will be returning, and the like. In some configurations, the voice-controlled device 124 might also display a picture or text indicating that the user 122A is away. The voice-controlled device 124 may also provide other information such as a time the user is expected back, a telephone number where the user may be reached, and the like.

Figure 2:
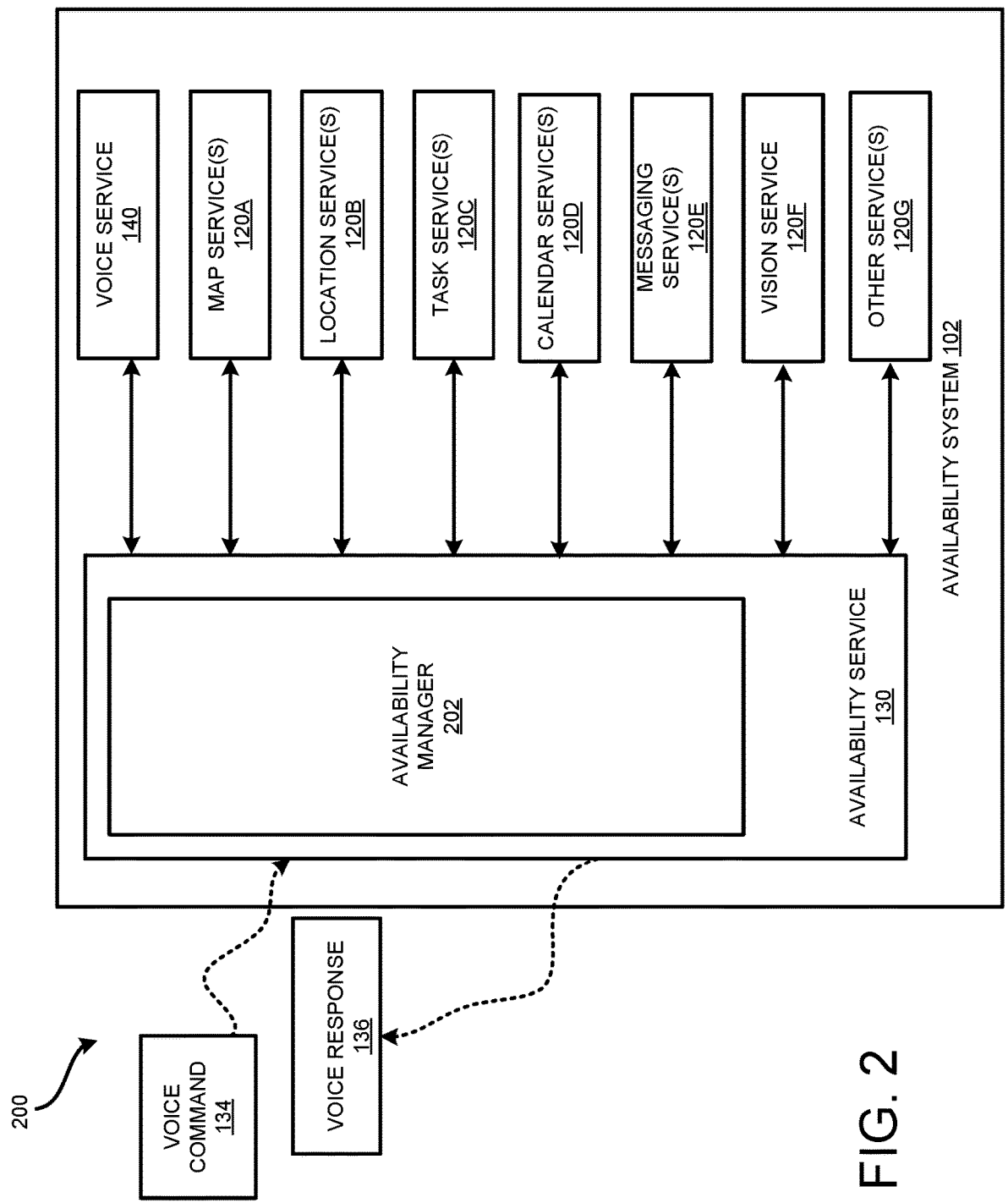
FIG. 2 is a software and network architecture diagram showing aspects of an availability system to provide availability information using different services associated with a service provider.

According to some examples, the availability service 130 may access other available services 120 to obtain data that may be used to automatically populate availability information about where the user is located and when the user will return (See FIG. 2 and related discussion). Additional details regarding the various processes described above with regard to FIG. 1 will be provided below with regard to FIGS. 2-8.

FIG. 2 is a software and network architecture diagram showing aspects of an availability system 102 to provide availability information using different services 120 associated with a service provider. It is to be appreciated that the environment 200 is merely illustrative and that the various configurations disclosed herein can be utilized in many different types of computing environments. FIG. 2 is similar to FIG. 1 but provides more details regarding the different services that can be utilized by the availability system 102.

As illustrated, availability system 102 includes voice service 140, map service(s) 120A, location service(s) 120B, task service(s) 120C, calendar service(s) 120D, messaging service(s) 120E, vision service 120F, and other services 120G. The availability service 130 may communicate with the services using one or more Application Programming Interfaces (APIs) exposed by one or more of the services. In some examples, each service may expose one or more APIs that can be used by the availability service 130, or some other component, to access functionality and/or data provided by the service.

According to some configurations, the availability service 130 is configured to access calendar service(s) 120D to obtain data of one or more work calendars, or other calendars, associated with user 122A. The calendar data is used by the availability service 130 to automatically populate the availability and location of the user 122A. In some examples, the availability manager 202 may access the calendar data to determine if user 122A configured an out of office auto reply, sent an out of office invite, or has a meeting or time blocked off in the calendar. If the calendar data indicates that user 122A is away, the availability manager 202 may provide availability information about user 122A to a requesting user 122B even if user 122A did not specifically inform the virtual assistant that they would be away.

In some examples, the availability manager 202 may also access one or more messaging service(s) 120E. The availability manager 202 may send messages using one or more of the messaging service(s) 120E. The availability service 120E may also access messaging data received from one or more of the messaging service(s) 120E to determine if the user 122A configured an away message. In other configurations, an authorized user, such as user 122A, may authorize ("opts-in") the availability service 130 access to content of messages (e.g., emails, text messages, . . . ) of the user. According to this example, the availability service 130 may access the content of one or more messages to determine message content that indicates availability information associated with the user.

The voice service 140 may include a voice interface that may comprise one or more components configured to receive audio signals generated by the voice-controlled device 124 and perform ASR, NLP, and/or NLU on the audio signals to identify users and voice commands.

The location service(s) 120B and/or the map service(s) 120A may be accessed by availability manager 202 to determine a current location of a user. The location service(s) 120B and/or the map service(s) 120A may include functionality that reports a location of user 122A (when authorized). For example, the availability manager 202 may request a location of the user 122A from one or more of the location service(s) 120B and/or the map service(s) 120A. According to examples, the user 122A authorizes ("opts-in") to allow one or more services, such as one or more of the location service(s) 120B to determine, utilize, and provide location data about the user. The user may allow some services access to location data and/or other data from other services and disallow other services to utilize location data and/or other data from other services. The user 122A may also authorize the availability service 130 to access and utilize data from the other services.

The task service(s) 120C are configured to provide functionality for managing tasks. Generally, task management is the process of managing a task from creation to completion of the task. In some examples, the availability manager 202 may access task data provided by one or more task service(s) 120C to assist in determining what user 122A is currently doing. For example, the task data may indicate that user 122A is currently performing a task with other co-workers.

The vision service 120F, may include a vision interface to identify requests of the user made via user gestures and route the requests to the appropriate domain. In some examples, the vision service 120F may be used by the availability manager 202 to identify and/or authenticate a user. Other service(s) 120G may provide other functionality not specifically discussed herein.

Figure 3:
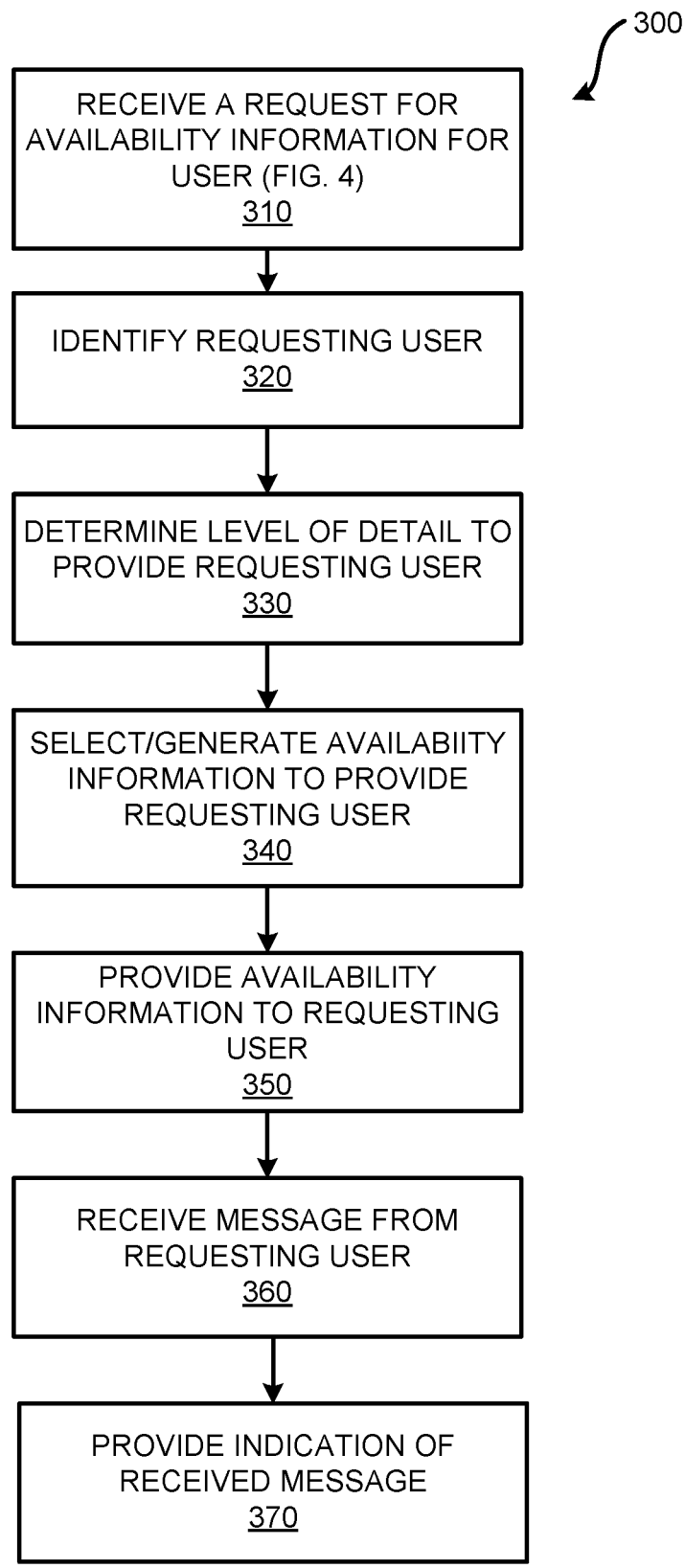
FIG. 3 is a flow diagram showing an illustrative routine for relaying availability using a virtual assistant.
Figure 4:
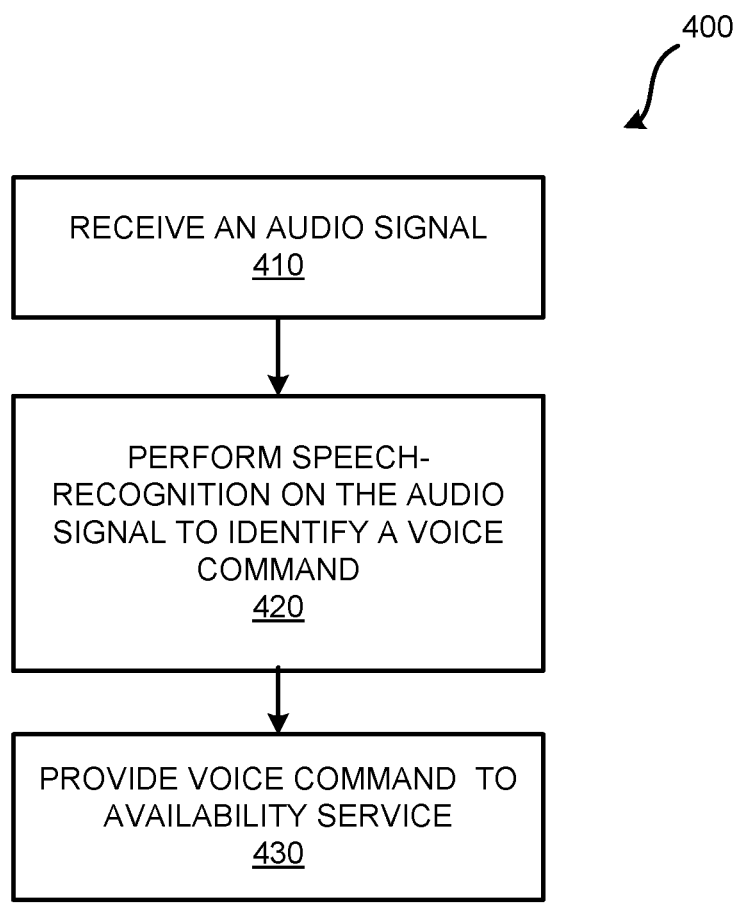
FIG. 4 is a flow diagram showing an illustrative routine for processing an auditory input associated with a virtual assistant.
Figure 5:
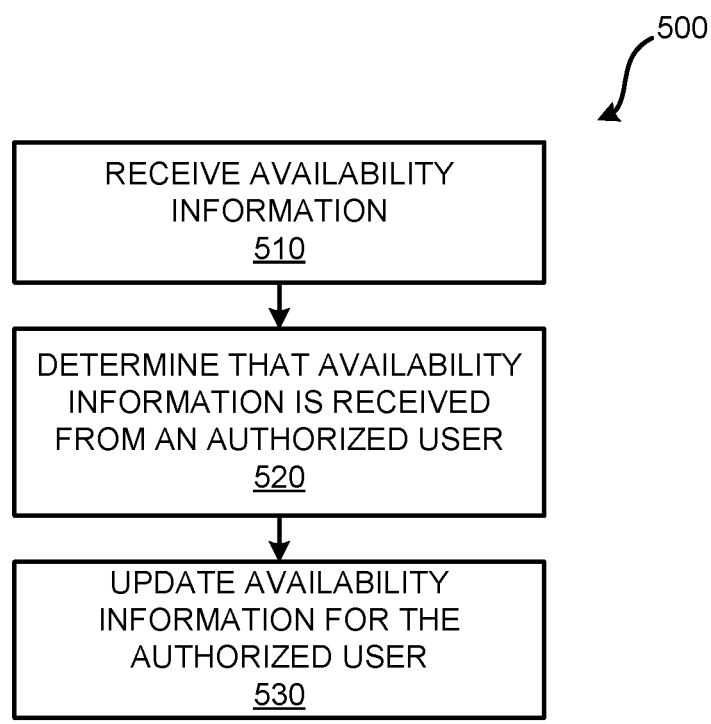
FIG. 5 is a flow diagram showing an illustrative routine for a user providing availability information to a virtual assistant.

FIGS. 3-5 are flow diagrams showing illustrative routines 300, 400, and 500 for interacting with a virtual assistant to relay availability information, according to examples disclosed herein. It should be appreciated that the logical operations described herein with respect to FIG. 3, FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 3 is a flow diagram showing an illustrative routine for relaying availability using a virtual assistant. At 310, a request for availability information for a user 122A is received from a requesting user 122B. As discussed above, the user 122B may provide a voice command 134B that requests availability information about the user. Generally, the voice command 134B includes one or more terms provided by a user 122B that are used by the availability service 130 to identify whether to provide availability information. For example, the voice-controlled device 124 may receive the voice command 134B using speech uttered by the user 122A. In other examples, user interface can be provided for submitting a command to the availability service 130. In other embodiments, the availability system 102 may cause a voice-controlled device 124 of the user 122A to audibly output audio data prompting the user 122B to provide the voice command 134B. For instance, via one or more speakers of the voice-controlled device 124, the availability system 102 may cause the voice-controlled device 124 to audibly output, "Are you looking for someone?" or something similar.

In some configurations, the requesting user 122B may request availability information about the user remotely from the voice-controlled device 124. For example, the requesting user 122B may ask another virtual assistant via one or more input devices (such as a different voice-controlled device) availability information about the user 122A. In this example, the different virtual assistant would contact the virtual assistant associated with the user 122A to obtain the availability information. In this way, the requesting user 122B could ask about another user without first going to some predefined location of the user 122A (e.g., a desk/office of the user 122A).

The voice command 134B may be audibly uttered by the user 122B, which is captured by one or more microphones of the voice-controlled device 124. Regardless of how the voice command 134B is provided by the user 122B, the voice-controlled device 124 and/or the availability system 102 may process the voice command 134, possibly using one or more speech recognition techniques (ASR) or one or more natural language processing techniques (NLU) in order to determine an intent associated with the search voice command 134 (See FIG. 4).

At 320, the requesting user 122B is attempted to be identified. As discussed above, the availability service 130 may identify the requesting user 122B by comparing stored voice signatures/profiles of previously identified users. In some examples, the identity of the requesting user 122B may be determined using some other technique or mechanism. For example, a vision service 120F may visually identify the requesting user 122B.

At 330, the availability service 130 may determine the level of detail to provide to the requesting user 122B. As discussed above, the level of detail to provide to a requesting user 122B may change based on the identity of the requesting user 122B. In some examples, the user 122A configures the level of detail provided to different requesting users 122B.

At 340, the availability service 130 selects and/or generates the availability information to provide to the requesting user. As discussed above, the availability service 130 may select availability information provided by the user 122A (e.g., a recorded message) and/or generate the availability information using other sources. For example, the availability service 130 may check one or more calendar service(s) 120D, messaging service(s) 120E, location service(s) 120B, and the like to determine the availability information for the user 122A.

At 350, the availability information is provided to the requesting user 122B. As discussed above, the availability information can be provided as a voice response 136, can be presented within a UI, or provided using some other mechanism. In some examples, the availability information may be audibly output via one or more speakers of the voice-controlled device 124 of the user 122A.

At 360, a message may be received from the requesting user 122B. As discussed above, the requesting user 122B may leave a message for the user 122A. In some configurations, the voice-controlled device 124 captures speech using one or more microphones of the voice-controlled device 124.

At 370, an indication of the received message is provided to the user 122A. As discussed above, the availability service 130 may send a message to the user 122A before the user 122A returns, and/or wait to provide the message when the user 122A returns. In some configurations, the voice-controlled device provides visual information (or other types of information) indicating that a message has been received and/or information about requesting users 122B that have stopped by.

FIG. 4 is a flow diagram showing an illustrative routine 400 for processing an auditory input associated with a virtual assistant, according to examples disclosed herein. The routine 400 begins at 410, where an audio signal is received. In some configurations, the audio signal is received from a voice-controlled device 124. The audio signal may include a voice command 134 of a user requesting to provide availability information or receive availability information.

At 420, speech-recognition on the audio signal is performed to identify the voice command 134 of the user 122. As discussed above, the voice-controlled device 124, the voice service 140, and/or some other component or device may determine whether the audio signal includes a voice command for providing or receiving availability information and/or the audio signal includes additional information or requests.

At 430, data associated with the voice command is provided to the availability service 130. For example, the voice service 140 may determine that the user 122B has requested availability information about user 122A, or that the user 122A is providing availability information.

FIG. 5 is a flow diagram showing an illustrative routine 500 for a user 122A providing availability information to a virtual assistant, according to examples disclosed herein. At 510, availability information is received from a user 122A. As discussed above, the user 122A may provide the availability information by one or more voice commands 134. In other examples, the availability service 130 may determine at least a portion of the availability information from one or more other sources (e.g., from calendar data, messaging data, location data, and the like).

At 520, the user 122 who provided the availability information is authenticated. As discussed above, in some examples, the availability service 130 attempts to identify users 122 that interact with the voice-controlled device 124. In some configurations, the availability service 130 utilizes a voice service 140 to determine whether the user 122 is an authorized user of the voice-controlled device 124.

At 530, the availability information is updated for the authorized user 122A. As discussed above, the availability information may be updated using the availability information provided via a voice command 134 and/or using data determined by the availability service 130. When the user returns from being away, the availability service 130 may also update the availability information.

Figure 6:
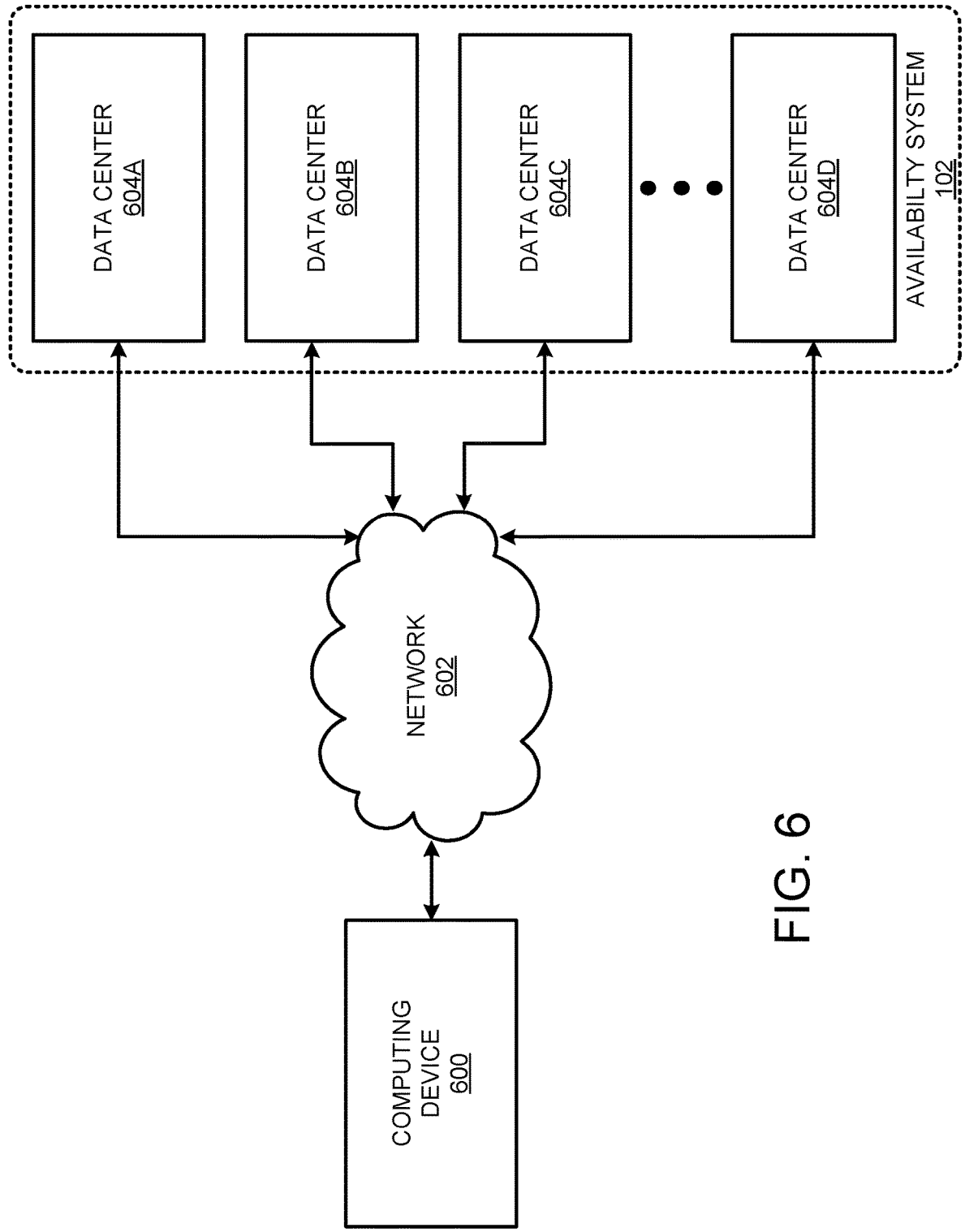
FIG. 6 is a system and network diagram that shows an illustrative operating environment including several data centers that can be configured to implement aspects of the functionality described herein.

FIG. 6 is a system and network diagram that shows one illustrative operating environment for the configurations disclosed herein that includes an availability system 102 that can be configured to provide the functionality described above. As discussed above, the availability system 102 can execute network services that provide computing resources for implementing the functionality disclosed herein. The computing resources implemented by the availability system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The availability system 102 can also include and utilize other types of computing resources not mentioned specifically herein.

As also discussed above, the computing resources provided by the availability system 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 8.

The users can access the services provided by the availability system 102 over a network 602, which can be a wide area communication network ("WAN"), such as the Internet, an intranet or an Internet service provider ("ISP") network or a combination of such networks. For example, and without limitation, a computing device 600 operated by a user or other user of the availability system 102, such as the voice-controlled device 124, can be utilized to access the availability system 102 by way of the network 602. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
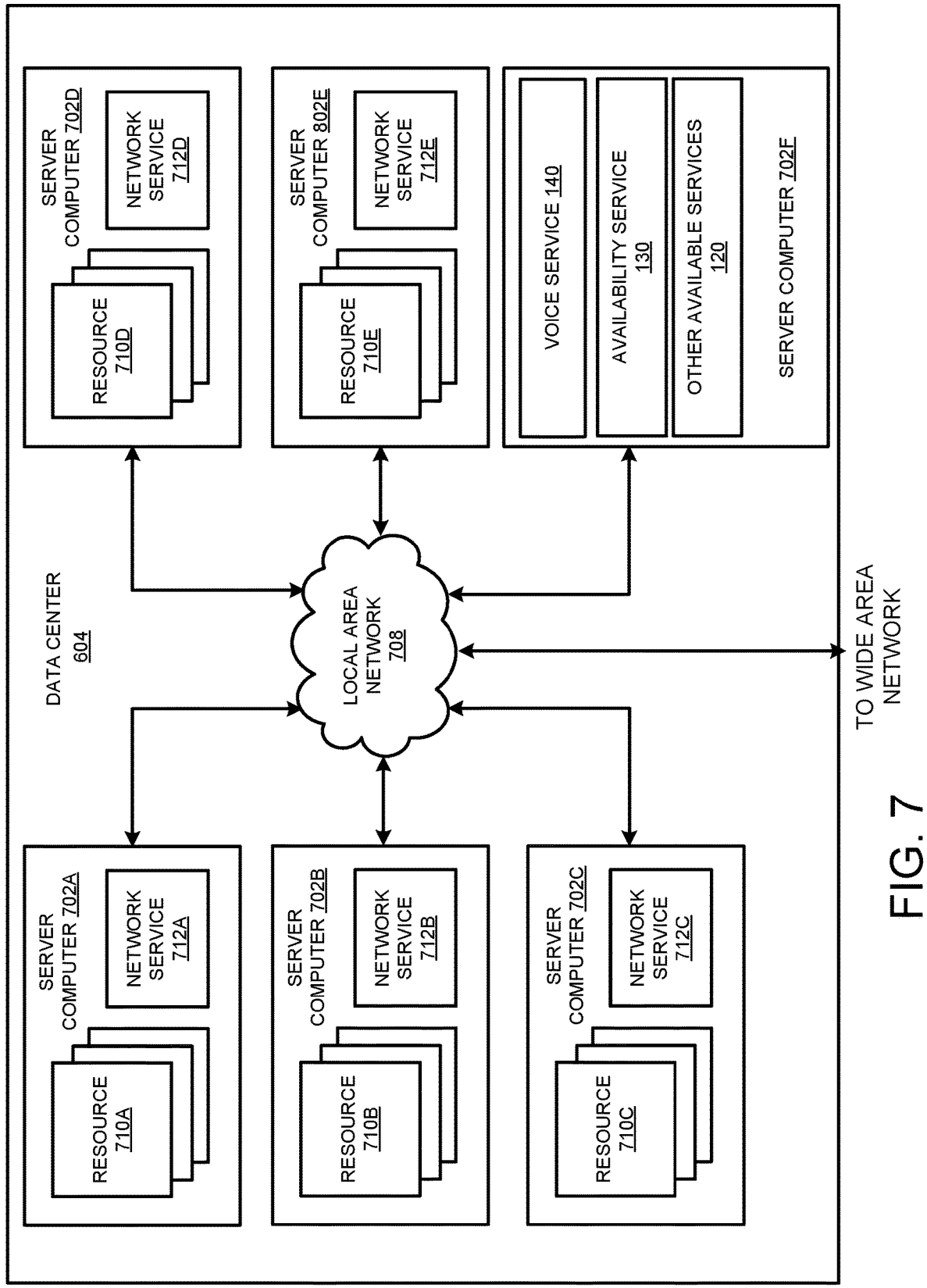
FIG. 7 is a computing system diagram illustrating a configuration for a data center that can be utilized to implement aspects of the technologies disclosed herein.

FIG. 7 is a computing system diagram that illustrates examples for a data center 604 that can be utilized to implement the voice service 140, the availability service 130, other available services 120, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rackmount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
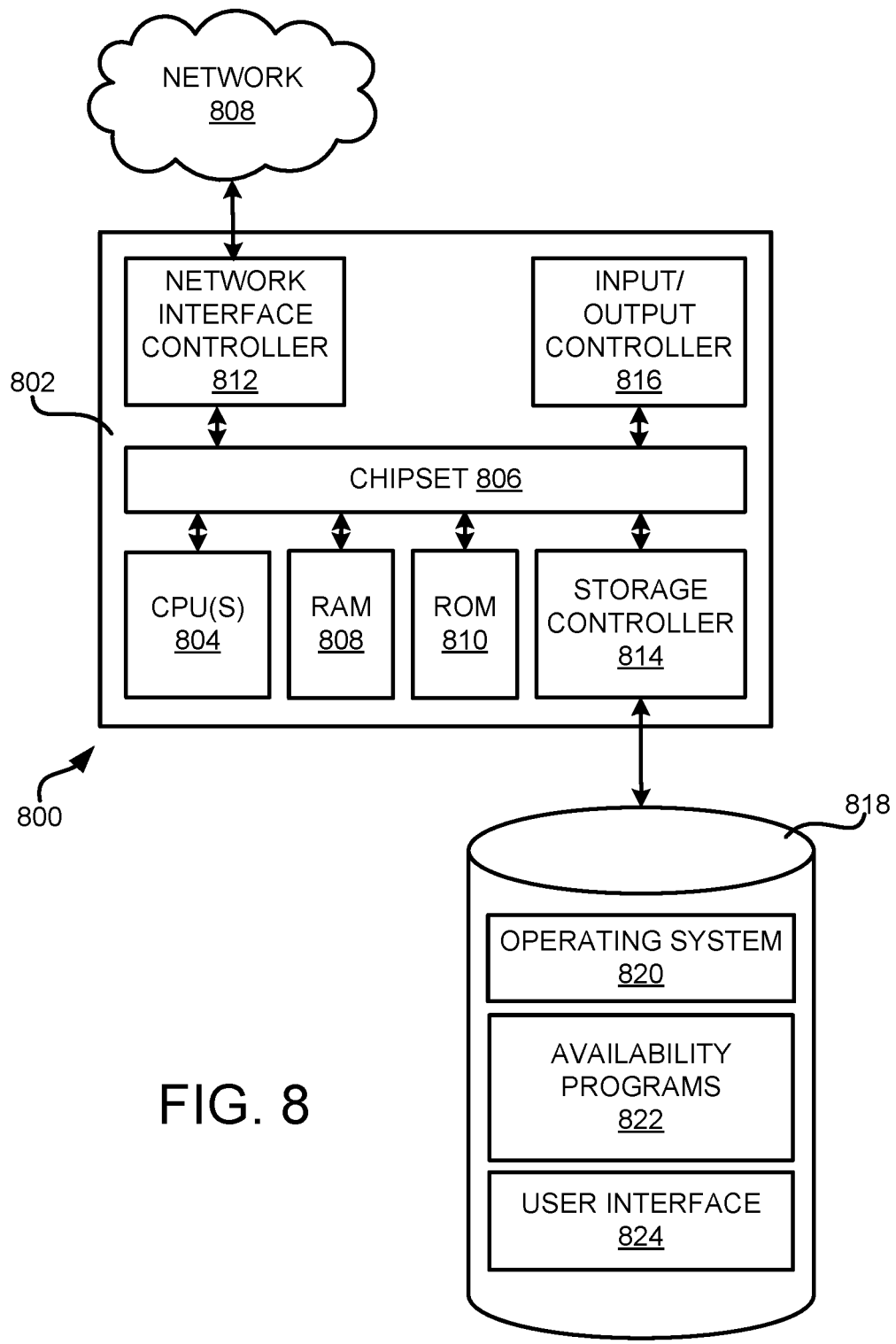
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, availability programs 822 for providing functionality associated with the availability system 102, user interface 824, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for interacting with a virtual assistant to relay availability information have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
a non-transitory computer-readable storage medium having instructions stored thereupon which, when executed by the one or more processors, cause the system to:
determine, by applying automated speech recognition (ASR) and natural language processing to a first audio signal associated with first speech that was uttered by a first user and that was captured by one or more microphones associated with a voice-controlled device, that the first speech relates to availability of the first user;
store availability information that indicates an availability of the first user in one or more of a memory or a data store;
receive, from the voice-controlled device, a second audio signal associated with second speech that was uttered by a second user and that was captured by the one or more microphones;
perform ASR on the second audio signal to identify a voice command requesting to receive information about the availability of the first user;
identify a relationship between the first user and the second user;
select a message indicating the availability of the first user based, at least in part, on the relationship; and
cause the message to be audibly output by one or more speakers of the voice-controlled device.

2. The system of claim 1, wherein selecting the message comprises selecting the message from a first message and a second message, wherein the first message includes a first level of detail that includes an expected return time for the first user and wherein the second message includes a second level of detail that includes the expected return time and an indicated location of the first user.

3. The system of claim 1, wherein identifying the relationship between the first user and the second user comprises accessing an organizational chart that indicates a working relationship between the first user and the second user.

4. The system of claim 1, wherein selecting the message comprises selecting the message from one or more messages identified from one or more voice commands provided by the first user to the voice-controlled device.

5. The system of claim 1, wherein the instructions further cause the system to:
receive a voice message, via the voice-controlled device, from the second user; and
provide a notification to the first user indicating that the second user left the voice message.

6. A computer-implemented method comprising:
receiving, by a voice-controlled device associated with a first user, an audio signal associated with a second user requesting availability information for the first user;
determining availability information for the first user to provide to the second user based, at least in part, on an authorization of the second user, wherein the availability information indicates information about a return of the first user; and
causing the availability information to be provided to the second user via the voice-controlled device.

7. The computer-implemented method of claim 6, wherein determining the availability information comprises selecting a message identified from a second voice command uttered by the first user.

8. The computer-implemented method of claim 6, wherein determining the availability information comprises selecting a first message or a second message, wherein the first message includes a first level of detail and wherein the second message includes a second level of detail that is different than the first level of detail.

9. The computer-implemented method of claim 8, wherein selecting the first message or the second message is based at least partly on determining a relationship between the first user and the second user.

10. The computer-implemented method of claim 6, further comprising:
receiving a voice message, via the voice-controlled device, from the second user to be provided to the first user; and
providing an indication, via the voice-controlled device, that the voice message was received.

11. The computer-implemented method of claim 10, further comprising transmitting a notification to the first user indicating that the second user provided the voice message.

12. The computer-implemented method of claim 6, further comprising:
obtaining availability information associated with the first user from one or more data sources;
determining that the first user is remote from a location based, at least in part, on the availability information; and
obtaining an estimated time of return to the location by the first user based, at least in part, on the availability information.

13. The computer-implemented method of claim 6, further comprising:
determining that the first user has returned to a location in which the voice-controlled device is located; and
providing information to the first user that indicates a number of individuals that frequented the location during a time in which the first user was remote from the location.

14. The computer-implemented method of claim 6, further comprising changing a display of one or more lights of the voice-controlled device to reflect that the first user is remote from a location of the voice-controlled device.

15. A system, comprising:
one or more processors; and
a non-transitory computer-readable storage medium having instructions stored thereupon which, when executed by the one or more processors, cause the system to perform actions, comprising:
determining, by at least one of a voice-controlled device associated with a first user or one or more devices remote from the voice-controlled device, an audio signal associated with a second user;
determining a voice command from the audio signal;
selecting availability information associated with the first user to provide to the second user; and
causing the availability information to be provided to the second user via the voice-controlled device.

16. The system of claim 15, wherein selecting the availability information comprises authenticating the second user and selecting a first message or a second message based at least part on a relationship of the first user to the second user, wherein the first message includes a first level of detail and wherein the second message includes a second level of detail that is different than the first level of detail.

17. The system of claim 15, the acts further comprising:
receiving a message, via the voice-controlled device, from the second user; and
providing an indication, via the voice-controlled device, that the message was received.

18. The system of claim 15, the actions further comprising transmitting a notification to the first user indicating that the second user provided the message.

19. The system of claim 15, the actions further comprising:
obtaining availability information associated with the first user from one or more data sources;
determining that the first user is remote from a location based, at least in part, on the availability information; and
obtaining an estimated time of return to the location by the first user based, at least in part, on the availability information.

20. The system of claim 15, the acts further comprising:
determining that the first user has returned to a location in which the voice-controlled device is located; and
providing information to the first user that indicates information about individuals who frequented the location during a time in which the first user was remote from the location.

\* \* \* \* \*